United States Patent Office 3,342,873
Patented Sept. 19, 1967

3,342,873
ALKOXYMETHYLATED DIAROMATIC ETHERS AND CONDENSATION PRODUCTS THEREOF
James D. Doedens, Midland, Mich., assignor to The Dow Chemical Company, Midland, Mich., a corporation of Delaware
No Drawing. Filed May 1, 1961, Ser. No. 106,548
The portion of the term of the patent subsequent to Feb. 23, 1982, has been dedicated to the public
2 Claims. (Cl. 260—613)

The present invention concerns certain new alkoxymethyl derivatives of diaromatic ethers which are capable of undergoing condensation to provide solid polymerized products. The invention is also concerned with the preparation of such monomeric and polymeric compositions.

It is a principal object of the present invention to provide novel monomeric compositions capable of being polymerized to provide solid resinous products. A further object of the invention is to provide novel resinous products that are highly resistant to the degradative action of water and aqueous alkalies. Additional objects are to provide methods for preparing alkoxymethylated diaryl ethers and the solid condensation products thereof. Other objects and benefits will become manifest hereinafter as the invention is more fully described.

It has been discovered that the above objects and benefits are accomplished in a polymerizable composition or compositions that may be characterized according to the following general formula:

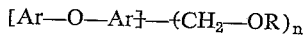

wherein Ar is an aromatic radical, preferably benzene derived, which may be nuclearly substituted with up to 2 alkyl, alkoxy and/or halo groups, $n$ is an integer from 1 to 4, R is an alkyl group containing from 1 to 4 carbon atoms. The manner of representing the connection of the alkoxymethyl moiety to the diaromatic ether indicates that it may be attached to either aromatic radical. Usually, the alkoxy-methyl moieties of the polyfunctional compounds will be distributed between the aromatic portions of the ether such that each aromatic radical of the compound will have at least one alkoxymethyl moiety and, when possible, an equal number of such moieties.

The compounds of the invention can be caused to condense to provide solid resinous products when heated at suitable elevated temperatures in the presence of a catalyst for the reaction. The reaction is accompanied by the splitting out of an alkanol corresponding to the protonated alkoxy portion of the above-described alkoxymethyl moiety. Catalysts for the reaction are generally of the class known as Friedel-Crafts catalysts. These catalysts are further characterizable as Lewis acids having a common property of catalyzing certain types of reactions involving aromatics.

The terminology "alkoxymethylated diaromatic ether composition," as employed herein, includes both individual alkoxymethyl derivatives and mixtures thereof. These compositions can be characterized by an alkoxymethyl functionality number which may range from 1 up to and including 4. The alkoxymethyl functionality is based on the number of such substituent groups per diaromatic ether molecule.

The polymerization products or condensed adducts of those compositions of mono or essentially monoalkoxymethyl functionality are thermoplastic, toluene-soluble, resinous products. "Essentially mono," as employed herein, means having an average alkoxymethyl functionality of 1 up to about 1.2. It is thus apparent that mixtures having a small proportion of derivatives of higher functionality can be utilized to provide thermoplastic resins. Such resinous products are useful as resinous binders and in addition they may be employed to prepare films or fibers which are water insoluble and resistant to the action of alkalies.

Those alkoxymethylated diaromatic ethers having from 2 up to and including 4 alkoxymethyl groups per molecule provide thermoset resinous products. In mixtures, however, an average alkoxymethyl functionality above a minimum of about 1.2 alkoxymethyl groups per molecule is all that is necessary to provide thermoset resins. By virtue of this fact, it is apparent that some and, in fact, a large proportion of monofunctional materials can be employed with those of a higher functionality to produce thermoset resins. Such thermoset resins can be utilized to provide any of a wide variety of useful molded, filled or unfilled, thermoset articles of construction. In addition, such resins are most advantageously adapted, when polymerized by means of mass reaction techniques, to provide solid plastic foams useful as insulation in the construction industry. The alkanol that is split out during the condensation reaction functions as a natural blowing agent at the temperature of the reaction.

To prepare the polymerizable compositions of the invention, a suitable alcohol such as methanol, ethanol, propanol or butanol is caused to condense with a halomethylated diaromatic ether composition in the presence of an alkali such as, for example, sodium hydroxide or carbonate. The reaction employed is essentially that of the Williamson ether synthesis.

The halomethylated diaromatic ether compositions utilized in this reaction are known. For example, such compositions can be obtained pursuant to the methods disclosed in United States Letters Patent 2,911,380. Specific halomethylated diaromatic ethers that are shown therein include mono(chloromethyl)diphenyl oxide, di(chloromethyl)diphenyl oxide, tri(chloromethyl)diphenyl oxide, tetra(chloromethyl)diphenyl oxide, mono(bromomethyl)diphenyl oxide, di(bromomethyl)diphenyl oxide, tri(bromomethyl)diphenyl oxide, tetra(bromomethyl)diphenyl oxide, mono(chloromethyl)ditolyl oxide, di(chloromethyl)ditolyl oxide, tri(chloromethyl)ditolyl oxide, tetra(chloromethyl)ditolyl oxide including all possible isomers and halo-, alkoxy- and alkyl-substituted derivatives of the foregoing halomethylated diaromatic ethers, the alkyl substituent groups containing from 1 to 4 carbon atoms. The foregoing compounds correspond generally to the following formula:

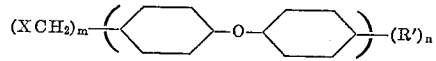

wherein R' is the above-described halo, alkoxy and/or alkyl group, X is selected from the group consisting of chlorine and bromine, $m$ is a number from 1 to 4, inclusive, and $n$ is an integer from 0 to 2. It will be observed that the compositions of the invention correspond to the above general formula except that X is replaced with an alkoxy radical containing from 1 to 4 carbon atoms.

As prepared, the halomethylated diaromatic ether compositions are usually mixtures of isomers and homologs having varying numbers of halomethylated substituents per molecule. While such product mixture can be separated to provide individual compounds which can be separately utilized in the present invention, the mixtures themselves are good starting materials for the preparation of the mixed alkoxy-methyl diaromatic ether compositions of the invention.

In preparing the alkoxymethylated diaromatic ethers of the invention, a preferred mode of operation involves adding an effective amount of alkali hydroxide to a mixture of the alcohol employed and the halomethylated diaromatic ether. The resulting mixture is heated at an elevated temperature of at least about 60° C. under autogenous pressures. Higher temperatures up to 170° C. can be employed and when the mixture is above its boiling point, the reaction is carried out in a pressurized system. A most convenient reaction temprature is the reflux temperature of the mixture. The minimum amount of alkali employed should be at least stoichiometrically equivalent to the halogen present in the halomethyl compound. Upper limits of alkali used are not critical. They are determined by economic and other practical considerations apparent to one skilled in the art. A preferred molar ratio of alkali to organic halogen is about 1.05:1.00.

As the alkail hydroxide is added to the alcohol-halomethylated diaromatic ether mixture, an exothermic effect occurs which is sufficiently pronounced that care should be exercised to avoid adding the ether too rapidly. At least enough alcohol is employed to react stoichiometrically with each available halomethyl group in the halomethylated diaromatic ether composition. Preferably, at least about 3 up to about 10 moles of the alkanol are employed for each chemical equivalent of halomethyl groups present. Larger amounts can be employed but it is generally unecomonical to do so.

While an effective amount of the desired product can be obtained within a few minutes of the initial contacting of the reactants, it is usually desirable to continue the reaction conditions for as much as several hours in order to insure that a substantial proportion of reactants is converted to the desired product. This is especially true if batch reaction techniques are being employed, but as will be readily apparent to one skilled in the art, continuous processes in which the unreacted ingredients are continuously recovered and recycled to the reaction zone feed streams may utilize comparatively short contact times for effective operation.

Upon achieving a desired degree of conversion of the reactants to the desired product, the reaction mass may be filtered to remove any alkali halides that are formed during the reaction. Subsequently, the filtrate is heated under reduced pressures to distill off any unreacted alkanol or other volatiles that may be present. The product that recovered consists essentially of the desired alkoxymethylated diaromatic ether.

The alkoxymethylated diaromatic ethers of the invention can be polymerized or condensed at temperatures above about 60° C. and in the presence of Friedel-Crafts catalysts to provide solid resins. As the alkyl portion of the alkoxymethyl substituent increases in size, the minimum temperature required to initiate condensation also increases. In any event, regardless of the size of the alkyl group, temperatures above about 165° C. are sufficient to cause the condensation reaction to occur. Preferably, the reaction is carried out whenever possible within the temperature range from about 130° to about 180° C. which temperature range is best for the preparation of foamed solid, resinous products. If desired, however, substantially higher temperatures, up to the decomposition temperatures of the polymerizable composition and resinous products thereof, can be employed.

In preparing the solid resins of the invention, catalysts that can be utilized to initiate the reaction include Friedel-Crafts catalysts such as ferric chloride, stannic chloride, stannous chloride, boron trifluoride, zinc chloride, phosphorus pentoxide, phosphoric acid and sulfuric acid. The condensation reactions are accomplished by heating the alkoxymethylated diaromatic ethers of the invention or mixtures thereof in the presence of one of the aforementioned catalysts to temperatures at which an alkanol is formed in the reaction mixture.

The amount of catalyst required to initiate the condensation reaction will vary according to the temperature employed. At lower temperatures, e.g., about 70° C., as much as 2 to 5 percent or more of the catalyst may be required based on the weight of the resin-forming alkoxymethylated diaromatic ether. At higher temperatures, e.g., above about 160°–200° C., lesser amounts of catalyst, e.g., about .1 to 1 percent by weight of the polymerizable composition, can be employed.

The reaction for the formation of the solid resins is usually conducted at atmospheric pressure or thereabouts but it also can be accomplished at higher or lower pressures. At atmospheric pressures and lower, the mass reaction products of the thermosettable compositions are normally solid foam products. Under substantially greater pressures such as those obtained in compression molding machines, the resinous products can be compressed into essentially dense nonfoamed bodies.

Solid resinous products of the invention that are prepared with phosphoric acid as the catalyst are self-extinguishing. When exposed to a flame that is subsequently withdrawn, any burning of such resinous products ceases within 2 seconds after removal of the flame source.

The resin-forming compositions of the invention can be most efficaciously applied to an inert filler substrate as the dispersed phase in a suitable solvent medium. For example, the alkoxymethylated diaromatic ether composition can be dispersed or emulsified in water, or dissolved in a relatively non-polar organic solvent such as xylene and in such forms be sprayed, poured or otherwise incorporated into or onto a suitable filler. The excess liquid is permitted to drain off and the dispersing solvent removed by evaporation. The latter operation may be aided by the employment of temperatures below those at which the alkoxymethylated diaryl ether undergoes condensation. Sufficient quantities of the resin-forming composition are thus incorporated into the filler to provide anywhere from about 1 to about 80 percent by weight of the ether based on the weight of the total composition. Usually, an effective quantity of a suitable catalyst is incorporated into the applicating solution and applied to the filler simultaneously with the resin-forming composition. Another method of catalyst application involves incorporating the catalyst into the resin-forming composition-filler combination in a separate step prior to curing the combination. The catalyzed, coated filler mass is shaped into a desired form and cured to a thermoset form by heating it at an elevated temperature above about 60° C. for a period of time anywhere from about 5 seconds to several minutes depending upon the particular temperature employed and thickness of the body to be cured and the like considerations affecting heat transfer.

Particular inert fillers that can be employed in conjunction with the resin-providing ethers of the invention include various inert filler substances such as, for example, siliceous fillers which include sand and glass fibers and carbonaceous fillers which include graphite, coke breeze, powdered coal and the like fillers. Other suitable fillers include mineral and synthetic fibers, asbestos, fly ash, blast furnace and powerhouse slags, mica flour, wood flour, wood particles and the like fibrous or granular substances that are substantially inert to the resin-providing ethers of the invention and which do not melt, fuse excessivley or decompose at or below temperatures required to cure or condense the ether binders, coated thereon.

The following examples illustrate the present invention but are not to be construed as limiting.

*Example 1*

A 1 liter flask equipped with a stirrer, thermometer and reflux condenser was charged with about 250 cc. of methanol and about 40 grams of sodium hydroxide. The resulting composition was heated to about 65° C. whereupon it started to reflux. At this point, 133 grams of parachloromethyl diphenyl oxide was added dropwise with stirring. Thereafter, the reaction mass was maintained at its reflux temperature for about 4 hours and then allowed to cool. The reaction product was filtered to remove sodium chloride, which solids were washed with toluene to remove any retained organic matter. A mixture of the initial filtrate and toluene wash filtrate was further washed with water three times. The organic phase was then dried over sodium sulfate and filtered. Toluene and residual alkanol in the organic product thus recovered were distilled off at about 100° C. under reduced pressure. Ultimately, 116.5 grams of a product were obtained having a refractive index, $n_D^{25}$, of 1.5638. This product was distilled and the fraction collected at about 105° C. under an absolute pressure of 0.25 millimeter of mercury and weighed 105 grams. The distillate exhibited a refractive index, $n_D^{25}$, of 1.5642. A portion of the purified product was subjected to chemical analysis for carbon and hydrogen. Also, an infrared absorption spectrum was obtained for the purified product. The product was found to contain 78.45 percent carbon and 6.66 percent hydrogen, which figures compare to theoretical amounts of 78.48 percent carbon and 6.59 percent hydrogen for monomethoxymethyl diphenyl oxide. Moreover, the infrared spectrum confirmed the structure of the resulting product as para-methoxymethyl diphenyl oxide.

To 15 grams of the monomethoxymethyl diphenyl oxide in a small beaker was added about 5 drops of phosphoric acid with agitation. The resulting mixture was then heated on a hot plate up to a temperature of about 190° C. at which point the mixture clouded up and methanol began to evolve. Thereafter, the temperature of the reaction mass rose to 201° C. Subsequently, the temperature of the reaction mass was increased to about 270° C. Over the higher temperature range, the viscosity of the reaction mass increased and its color changed from an essentially clear mass to light yellow. When cooled, the reaction mass became a hard, yellow solid. The molecular weight of the resulting polymer, as determined by the boiling point elevation technique in a modified Menzies-Wright ebulliometer, was about 1650.

The course of the polymerization reaction can be followed by the technique of drawing small portions of the reaction mass into fibers. The extent or degree of reaction is directly proportional to the length of a fiber that can be drawn from the reaction mass.

*Example 2*

To a three liter glass flask equipped with a reflux condenser, stirrer and dropping funnel was added 400 grams of methanol and 198 grams of 85 percent potassium hydroxide. The resulting mixture was heated to its reflux temperature and a solution of 401 grams of 4,4'-di(chloromethyl)diphenyl oxide in 272 grams of methanol was added dropwise to the methanol-alkali solution. During the course of the addition of the chloromethylated diaromatic ether, the reaction mass was maintained at its reflux temperature as a result of the exothermic nature of the reaction. After the addition of the ether was complete, the reaction mixture was maintained at its reflux temperature for about 3 hours in order to insure substantial conversion of the reactants to the desired product. The reaction mixture was then cooled and potassium chloride separated therefrom by filtration. The filtrate was heated under a vacuum to remove unreacted methanol and the residual product distilled in a 6 inch Vigreaux column under reduced pressure. The fraction collected boiled at about 143° C. under an absolute pressure of 0.3 millimeter of mercury. Based on the starting material, the yield of 4,4'-di(methoxymethyl)diphenyl oxide thus obtained was 62.5 percent. It was a water-clear liquid having a refractive index, $n_D^{25}$, of 1.5543.

In a manner similar to that above, other compositions of the invention were prepared by substituting other alcohols such as ethanol, propanol and butanol for the methanol to provide the corresponding 4,4'-di(alkoxymethyl)diphenyl oxide products. The refractive index and boiling points at reduced pressures of these products are set forth in the following Table 1.

TABLE 1

| Composition Prepared | Refractive Index, 25° C. | Boiling, Point Abs. Pres. | Yield (percent) |
|---|---|---|---|
| 4,4'-di(ethoxymethyl)-diphenyl oxide. | 1.5405 | 166° C. at 0.1 mm. Hg. | 72 |
| 4,4'-di(propoxymethyl)-diphenyl oxide. | 1.5321 | 186° C. at 0.2 mm. Hg. | 67 |
| 4,4'-di(butoxymethyl)-diphenyl oxide. | 1.5265 | 193° C. at 0.3 mm. Hg. | 51 |

*Example 3*

Mixed reaction products obtained by chloromethylating of diphenyl oxide were etherified with methanol, ethanol, propanol and butanol in the presence of caustic according to the procedure employed in Example 2. The compositions of the mixed chloromethylated diaromatic ethers that were employed are set forth in the following Table 2. A convenient designation of a particular reaction product mixture is the weight of chlorine in that mixture.

TABLE 2

| Component | Halomethylated Diaromatic Ether Compositions Classified According to Chlorine Content (mole percent) | | | |
|---|---|---|---|---|
| | 17.6% Cl. (CMDPO-17) | 26.7% Cl. (CMDPO-23) | 25.2% Cl. (CMDPO-25) | 31.7% Cl. (CMDPO-32) |
| Diphenyl ether (DPO) | 17.3 | 0.0 | 0.0 | 0.0 |
| o-Monochloromethyl DPO | 5.3 | 0.5 | 0.25 | 0.0 |
| p-Monochloromethyl DPO | 42.9 | 4.7 | 2.35 | 0.04 |
| o-p'-Dichloromethyl DPO | 10.8 | 35.4 | 17.7 | 1.9 |
| p,p'-Dichloromethyl DPO | 20.6 | 37.7 | 69.5 | 8.6 |
| Trichloromethyl DPO | 2.3 | 21.1 | 10.5 | 89.0 |
| Tetrachloromethyl DPO | 0.5–1.0 | 0.5–1.0 | 0.5 | |

The mixed alkoxymethylated products thus obtained are set forth in the following Table 3 along with their refractive index, density and color properties.

TABLE 3

| Run No. | Mixed Alkoxymethyl DPO Comp. | Chloromethylated DPO Precursor | $n_D^{20}$ | $d_{20}^{20}$ | Color |
|---|---|---|---|---|---|
| 1 | Methoxymethyl DPO | CMDPO-17 | 1.5586 | 1.073 | Yellow. |
| 2 | Ethoxymethyl DPO | CMDPO-17 | 1.5515 | 1.059 | Dark yellow. |
| 3 | Propoxymethyl DPO | CMDPO-17 | 1.5452 | 1.042 | Yellow. |
| 4 | Butoxymethyl DPO | CMDPO-17 | 1.5611 | 1.117 | Lt. yellow. |
| 5 | Methoxymethyl DPO | CMDPO-23 | 1.5467 | 1.078 | Do. |
| 6 | Ethoxymethyl DPO | CMDPO-23 | 1.5381 | 1.054 | Yellow. |
| 7 | Propoxymethyl DPO | CMDPO-23 | 1.5300 | 1.033 | Med. yellow. |
| 8 | Butoxymethyl DPO | CMDPO-23 | 1.5589 | 1.110 | Very lt. yellow. |
| 9 | Methoxymethyl DPO | CMDPO-25 | 1.5442 | 1.069 | Do. |
| 10 | Ethoxymethyl DPO | CMDPO-25 | 1.5355 | 1.046 | Yellow. |
| 11 | Propoxymethyl DPO | CMDPO-25 | 1.5289 | 1.028 | Do. |
| 12 | Butoxymethyl DPO | CMDPO-25 | 1.5540 | 1.112 | Lt. yellow. |
| 13 | Methoxymethyl DPO | CMDPO-32 | 1.5375 | 1.064 | Med. yellow. |
| 14 | Ethoxymethyl DPO | CMDPO-32 | 1.5277 | 1.040 | Cloudy amber. |
| 15 | Propoxymethyl DPO | CMDPO-32 | 1.5210 | 1.010 | Dark yellow. |
| 16 | Butoxymethyl DPO | CMDPO-32 | | | |

Each of the above tested mixed alkoxymethyl diphenyl oxide compositions was mass polymerized in the presence of 1 percent by weight of phosphoric acid at 200° C. The polymerization products obtained from the compositions in Runs 1–4 were solid thermoplastic resins. The polymerization products obtained from those compositions in Runs 5–16 were thermoset foams varying in density from about 2 to 5 lbs./ft.³. All of the resins thus prepared were self-extinguishing within 2 seconds when subjected to a flame that was subsequently removed. They varied in color from light pink to light tan.

*Example 4*

The alkoxymethylated diphenyl oxides prepared in the above examples wherein the alkyl group is methyl, ethyl, propyl or butyl, which compounds have an average alkoxymethyl functionality per molecule of at least 1.2, are mixed with about ½ percent by weight of ferric chloride based on the weight of the polymerizable composition. The liquid catalyzed composition is then applied directly to a woven fiberglass substrate and the resulting coated article molded simultaneously with the application of heat above about 200° C. to provide a solid thermoset shaped article having excellent resistance to the action of alkalies.

Results similar to that of the foregoing are achieved when another catalyst for the reaction such as zinc chloride, boron trifluoride, stannic chloride, stannous chloride, antimony chloride, phosphorus pentoxide or sulfuric acid is substituted for the phosphoric acid of Examples 1–3 and the ferric chloride of Example 4.

What is claimed is:
1. A composition of matter having the general formula:

wherein R is selected from the group consisting of methyl, ethyl, propyl and butyl radicals, R' is selected from the group consisting of alkyl, alkoxy and halogen radicals wherein the alkyl group contains from 1 to 4 carbon atoms, $m$ is a number from 1 to 1.2, inclusive, and $n$ is an integer from 0 to 2.

2. Mono(alkoxymethyl)diphenyl oxide wherein the alkyl group contains from 1 to 4 carbon atoms.

References Cited

UNITED STATES PATENTS

| | | | |
|---|---|---|---|
| 1,932,595 | 12/1931 | Muth | 260—613 |
| 2,649,436 | 8/1953 | Bock | 260—47 |
| 2,662,871 | 12/1953 | Bock | 260—47 |
| 2,739,171 | 3/1956 | Linn | 260—613 |
| 2,821,551 | 1/1958 | Katzschmann | 260—611 X |
| 2,875,251 | 2/1959 | Rigterink | 260—611 |
| 2,881,150 | 4/1959 | Jaruzelski | 260—611 |
| 3,170,959 | 2/1965 | Trapp | 260—613 |

FOREIGN PATENTS

| | | |
|---|---|---|
| 956,335 | 4/1964 | Great Britain. |
| 1,204,466 | 8/1959 | France. |

OTHER REFERENCES

Takeda: Chemical Abstracts, vol. 43 (1949), columns 2231–2232.

LEON ZITVER, *Primary Examiner.*

LORRAINE A. WEINBERGER, *Examiner.*

W. G. GOODSON, B. HELFIN, *Assistant Examiners.*